J. F. LEAVITT & H. T. CLARK.
TICKETS.
No. 177,407.  Patented May 16, 1876.
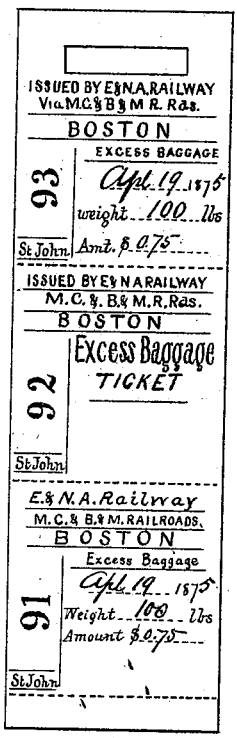
Witness
W. E. Brown
L. A. Perine
Inventors
J. F. Leavitt
H. T. Clark
Per Franklin Jeavy
Atty.

UNITED STATES PATENT OFFICE.

JOSEPH F. LEAVITT AND HENRY T. CLARK, OF BANGOR, MAINE.

IMPROVEMENT IN TICKETS.

Specification forming part of Letters Patent No. 177,407, dated May 16, 1876; application filed April 23, 1875.

*To all whom it may concern:*

Be it known that we, JOSEPH FREDERICK LEAVITT and HENRY THURSTON CLARK, both of Bangor, in the county of Penobscot and State of Maine, have invented certain new and useful Improvements in Device for Checking Excess Baggage, &c.; and we do hereby declare that the following is a full, clear, and exact description thereof, that will enable others skilled in the art to which it appertains to make and use the same, reference being had to the accompanying drawings, forming a part of this specification, in which is shown our device for checking excess baggage, &c.

Our device is intended to be employed more particularly for the collection of charges for excess or extra baggage on railroads, &c., serving as a check upon the baggage-master at the starting-point, as a means of proving at its destination that the charges have been paid, and as an additional means of identifying the baggage. In cases where the baggage passes over connecting lines it also serves as a basis of settlement between the roads at each end, and enables intermediate roads to obtain a record of same by copying the number and date of the check, the amount of excess-weight, and the charges thereon. This is, in fact, the principal object of our invention: to furnish a means for adjusting accounts between a number of companies, more than two, and for preventing terminal companies from taking advantage of those controlling intermediate lines.

Our invention is also applicable to other uses, which readily suggest themselves.

Our device consists of a ticket or check in three parts, *a b c*, having consecutive or like numbers or characters to indicate that they belong to the same series. One of these parts, *a*, has upon it its number or character, as stated, and the destination, together with blanks for the date, weight of excess baggage, and amount collected therefor. This is designed to be attached to the baggage by any convenient means, the blanks having been properly filled. Part *b* has upon it its number or character, as stated, and destination, and is intended for the passenger, being a receipt for the amount paid for excess baggage which amount is specified on the check *a*. Part *c* is similar to part *a*, having its number and destination, and similar blanks to be filled in like manner. This is to be retained by the baggage-master, to be returned to the railroad with his report, serving as a stub.

All the parts have upon them the name of the starting-point, or character denoting it, and may also have words or characters indicating the road by which they are issued, or over which they are to pass, or any other matter which may be desired.

We do not limit ourselves to any particular form of ticket or method of connecting them, nor do we limit ourselves to the precise lettering and arrangement shown, as it may be desirable to make some variation if the device is used for other purposes.

When a record of excess baggage is not required from the dispatching baggage-master, or in cases where the old system of reports is preferred, our ticket *b* and check *a* may be used without the stub *c*. In such case the ticket *b* serves as a receipt for the amount paid, which is specified on the check *a;* or the check *a* may be used alone, without the ticket or stub, the ordinary baggage-check serving to identify the luggage, and the check *a* indicating merely the destination, date, extra weight, and charges for same with starting-point.

We do not claim the baggage-check shown in the Patent of E. H. Paine, granted November 24, 1868, and consisting of the substitution of a paper check for a metallic check; nor do we claim the device shown in T. H. Jebb's Patent of March 25, 1873, which operates in a different way from our device.

What we claim as our invention, and desire to secure by Letters Patent, is—

1. The device for checking excess baggage, consisting of the ticket *a*, check *b*, and stub *c*, substantially as herein described, for the purposes set forth.

2. The check and receipt-ticket, substantially as described, the former being attached to the luggage, and the latter being the passenger's receipt for excess baggage-charges, substantially as set forth.

In testimony that we claim the foregoing we have hereunto set our hands this 19th day of April, 1875.

JOSEPH F. LEAVITT.
HENRY T. CLARK.

Witnesses:
WM. FRANKLIN SEAVEY,
W. E. BROWN.